(12) United States Patent
Shiromoto et al.

(10) Patent No.: US 12,123,935 B2
(45) Date of Patent: Oct. 22, 2024

(54) SOLID-STATE RADAR DEVICE, SOLID-STATE RADAR CONTROL METHOD, AND NON-TRANSITORY COMPUTER READABLE MEDIUM

(71) Applicant: FURUNO ELECTRIC CO., LTD., Hyogo (JP)

(72) Inventors: Masayuki Shiromoto, Nishinomiya (JP); Ryosuke Morigaki, Nishinomiya (JP)

(73) Assignee: FURUNO ELECTRIC CO., LTD., Hyogo (JP)

( * ) Notice: Subject to any disclaimer, the term of this patent is extended or adjusted under 35 U.S.C. 154(b) by 456 days.

(21) Appl. No.: 17/701,638

(22) Filed: Mar. 22, 2022

(65) Prior Publication Data

US 2022/0214439 A1    Jul. 7, 2022

Related U.S. Application Data

(63) Continuation of application No. PCT/JP2020/039706, filed on Oct. 22, 2020.

(30) Foreign Application Priority Data

Nov. 21, 2019    (JP) ................. 2019-210456

(51) Int. Cl.
*G01S 13/28*    (2006.01)
*G01S 7/288*    (2006.01)
(Continued)

(52) U.S. Cl.
CPC .......... *G01S 13/282* (2013.01); *G01S 7/2883* (2021.05); *G01S 7/411* (2013.01); *G01S 13/956* (2013.01); *H01Q 3/08* (2013.01)

(58) Field of Classification Search
CPC ........ G01S 13/28; G01S 13/02; G01S 7/2883; G01S 7/411; G01S 13/956; G01S 13/917; G01S 13/937; H01Q 3/08
See application file for complete search history.

(56) References Cited

U.S. PATENT DOCUMENTS 10,677,912 B2    6/2020  Nakatani
2008/0018526 A1  1/2008  Wade
(Continued)

FOREIGN PATENT DOCUMENTS

JP    2010133868    6/2010
JP    2016206152    12/2016
(Continued)

OTHER PUBLICATIONS

"International Search Report (Form PCT/ISA/210) of PCT/JP2020/039706", mailed on Dec. 22, 2020, with English translation thereof, pp. 1-4.
(Continued)

*Primary Examiner* — Vladimir Magloire
*Assistant Examiner* — Noah Yi Min Zhu
(74) *Attorney, Agent, or Firm* — JCIPRNET

(57) ABSTRACT

The solid-state radar device includes: a transmission/reception unit configured to transmitting and receiving radio wave signals comprising a modulated signal and a non-modulated signal, which are pulse signals whose frequencies are different from each other; a frequency filter unit configured respectively to extract the modulated signal and the non-modulated signal from the received radio wave signals based on the frequencies; a pulse compression unit generating a pulse-compressed signal by pulse-compressing the modulated signal; a first echo image generation unit configured to generate a first echo image based on the non-modulated signal and the pulse-compressed signal; a wave analysis unit
(Continued)

configured to analyze ocean wave information based on one of the non-modulated signal and the pulse-compressed signal; and a display signal generation unit configured to generate a display signal comprising the first echo image and/or the ocean wave information.

15 Claims, 7 Drawing Sheets

(51) Int. Cl.
  *G01S 7/41* (2006.01)
  *G01S 13/95* (2006.01)
  *H01Q 3/08* (2006.01)

(56) References Cited

U.S. PATENT DOCUMENTS

| 2010/0315284 | A1  |         | 12/2010 | Trizna                   |
|--------------|-----|---------|---------|--------------------------|
| 2012/0313814 | A1  | *       | 12/2012 | Kojima ......... G01S 7/0232 |
|              |     |         |         | 342/201                  |
| 2013/0342383 | A1  | *       | 12/2013 | Kojima ............ G01S 13/28 |
|              |     |         |         | 342/134                  |
| 2015/0048971 | A1  | *       | 2/2015  | Susaki ............ G01S 13/956 |
|              |     |         |         | 342/450                  |
| 2016/0252606 | A1  |         | 9/2016  | Storz                    |
| 2017/0123050 | A1  | *       | 5/2017  | Yamabayashi ...... G01S 13/72 |
| 2018/0284255 | A1  |         | 10/2018 | Nakatani                 |

FOREIGN PATENT DOCUMENTS

| JP | WO2014125958 | 2/2017  |
|----|--------------|---------|
| JP | WO2016125400 | 11/2017 |
| JP | WO2017179344 | 2/2019  |
| WO | 2014042134   | 3/2014  |
| WO | 2017179344   | 10/2017 |

OTHER PUBLICATIONS

"Search Report of Europe Counterpart Application", issued on Oct. 26, 2023, p. 1-p. 7.

* cited by examiner

SOLID-STATE RADAR DEVICE, SOLID-STATE RADAR CONTROL METHOD, AND NON-TRANSITORY COMPUTER READABLE MEDIUM

CROSS-REFERENCE TO RELATED APPLICATION

This application is a Continuation of PCT International Application No. PCT/JP2020/039706, filed on Oct. 22, 2020, which claims priority under 35 U.S.C § 119(a) to Japan Patent Application No. 2019-210456, filed on Nov. 21, 2019. The entirety of each of the above-mentioned patent applications is hereby incorporated by reference herein and made a part of this specification.

TECHNICAL FIELD

The disclosure relates to a solid-state radar device and a radar control method and a radar control system thereof.

RELATED ART

Conventionally, regarding radars for ships used for monitoring the periphery of the own ship, magnetron radars using magnetron elements in transmission elements have been the mainstream. Background Compared to the magnetron radars, solid-state radars, whose development started in rather recent years, use semiconductors as transmission elements, and have the advantages of having a narrow bandwidth, a miniaturized size, and being maintenance-free. However, due to the characteristics of the transmission element, the transmission peak power of a solid-state radar is far lower than the transmission peak power of a magnetron radar. Therefore, in order to observe a remote target, the solid-state radar may transmit a pulse-like signal whose frequency is modulated (chirped pulse signal) to pulse-compress waves reflected from the target and improve the S/N ratio.

In addition, the radars for ships are also used to observe waves in the periphery of the own ship, in addition to monitoring the periphery of the own ship, and are referred to as wave radars for wave observation. The wave radars analyze the reflected waves of the transmission signals returned from the sea level in the periphery of the own ship, and output ocean wave information, such as wave heights, periods, wavelengths, wave directions, etc., of the waves. In addition, wave radars have been developed by using magnetron radars.

CITATION LIST

Patent Literature

[Patent Literature 1]: WO 2017-179344
[Patent Literature 2]: WO 2014-125958

SUMMARY

Technical Problem

In the case of remote monitoring, in a magnetron radar, a transmission signal is set as a non-modulated signal (long pulse) composed of a long pulse width for long distance observation. Meanwhile, in the case of wave observation in the vicinity of the own ship, in order to obtain a sufficient resolution with respect to waves with a short wavelength, transmission signals are mostly set as non-modulated signals (short-pulse or middle-pulse) of a short pulse width for short distance to intermediate distance observation. Therefore, in the case where wave observation and periphery monitoring are performed at the same time by using short pulse or middle pulse signals in the transmission signals, the magnetron radar is unable to observe a remote target. As a result, the magnetron radar is unable to sufficiently fulfill the purpose of periphery monitoring.

For such reasons, a user who performs periphery monitoring including remote monitoring in wave observation needs to be respectively provided with a radar for wave observation and a radar for target observation.

The purpose of the disclosure relates to providing a solid-state radar device capable of fulfilling the functions of wave observation as well as periphery monitoring including remote monitoring at the same time.

Solution to Problem

In order to solve the above issue, a solid-state radar device according to the disclosure includes: a transmission/reception unit configured to transmitting and receiving radio wave signals comprising a modulated signal and a non-modulated signal, which are pulse signals whose frequencies are different from each other; a frequency filter unit configured respectively to extract the modulated signal and the non-modulated signal from the received radio wave signals based on the frequencies; a pulse compression unit generating a pulse-compressed signal by pulse-compressing the modulated signal; a first echo image generation unit configured to generate a first echo image based on the non-modulated signal and the pulse-compressed signal; a wave analysis unit configured to analyze ocean wave information based on one of the non-modulated signal and the pulse-compressed signal; and a display signal generation unit configured to generate a display signal comprising the first echo image and/or the ocean wave information.

In addition, a refresh rate for generating the first echo image for each azimuth may be more frequent than a refresh rate for analyzing the ocean wave information.

In addition, the transmission/reception unit further comprises a rotating antenna, and the wave analysis unit may analyze the ocean wave information by analyzing a scan image comprising the first echo image corresponding to at least one rotation of the antenna.

In addition, the first echo image may be divided into a plurality of regions in accordance with a distance from a transmission location, and the regions may be formed from an image based on at least one of the non-modulated signal and the pulse-compressed signal. The wave analysis unit may analyze the ocean wave information from one of the regions.

In addition, at least one of the regions may be formed from a synthesized image in which a formation ratio of the non-modulated signal and the pulse-compressed signal is changed in accordance with distance.

In addition, the display signal generation unit may generate a display signal in which the first echo image and the ocean wave information are displayed at a same time on a same screen.

In addition, the display signal generation unit may generate a display signal in which information of at least a portion of the ocean wave information is superimposed on the first echo image.

In addition, the display signal generation unit may generate a display signal in which an analysis region, which is a region for analyzing the ocean wave information, is superimposed on the first echo image.

In addition, the solid-state radar device may further include an analysis region input unit which receives an input for setting or changing at least one of a number, a location, and a size of the analysis region.

In addition, the solid-state radar device may further include a heading acquisition unit, on which the solid-state radar is to be installed, which calculates a heading of an own ship. The ocean wave information may include information of a wave direction. The display signal generation unit may generate a display signal indicating a relative angle between the wave direction and the heading.

In addition, the display signal generation unit may generate a display signal of a wave image based on the ocean wave information.

In addition, the solid-state radar device may further include a second echo image generation unit which generates a second echo image based on one of the non-modulated signal and the pulse-compressed signal. The wave analysis unit may calculate the ocean wave information by analyzing a region of a portion of the second echo image.

In addition, the transmission/reception unit may further include an antenna that rotates, and the wave analysis unit may calculate the ocean wave information by analyzing a scan image composed of the second echo image corresponding to one rotation of the antenna.

According to the configuration, by transmitting the radio wave signals whose frequencies are different and respectively separating the radio wave signals from reflected waves, it is possible for the solid-state radar device to fulfill wave observation and monitoring at the same time.

According to the disclosure, it is possible to fulfill the functions of wave observation as well as monitoring including remote monitoring at the same time by using a single solid-state radar device.

Figure 5:
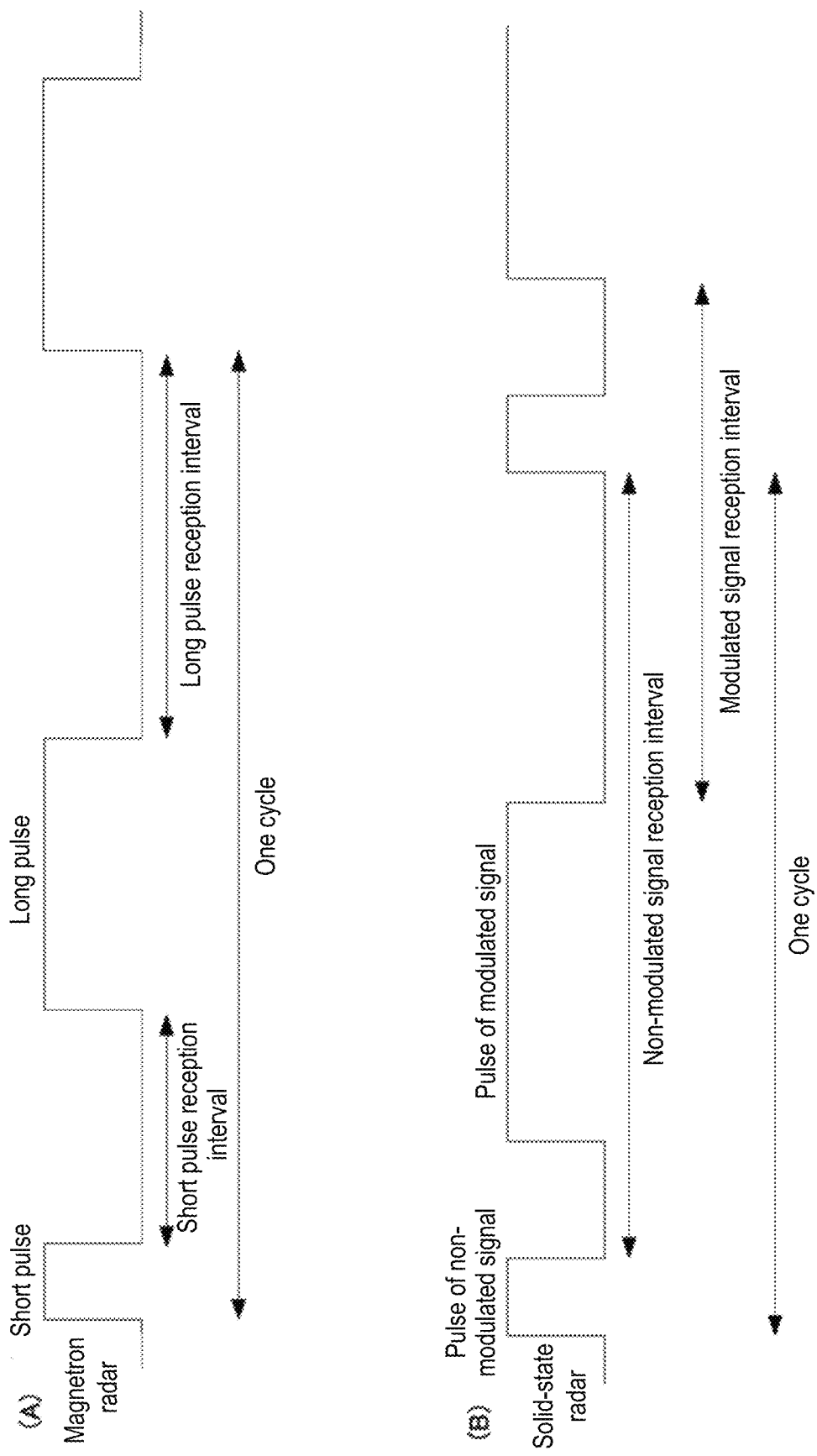

(A) of FIG. 5 is a diagram illustrating a mode of a transmission signal in a magnetron radar, and (B) of FIG. 5 is diagram illustrating a mode of a transmission signal according to an embodiment of the disclosure.

Figure 6:
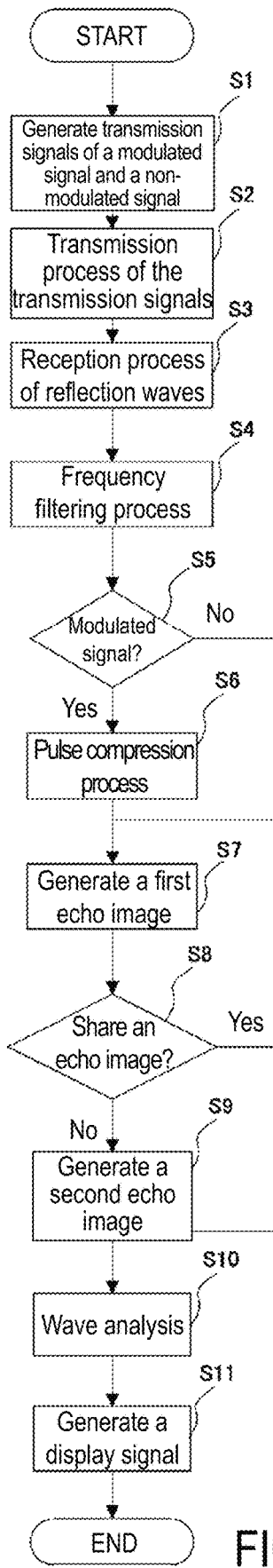

FIG. 6 is a flowchart according to an embodiment of the disclosure.

Figure 7:
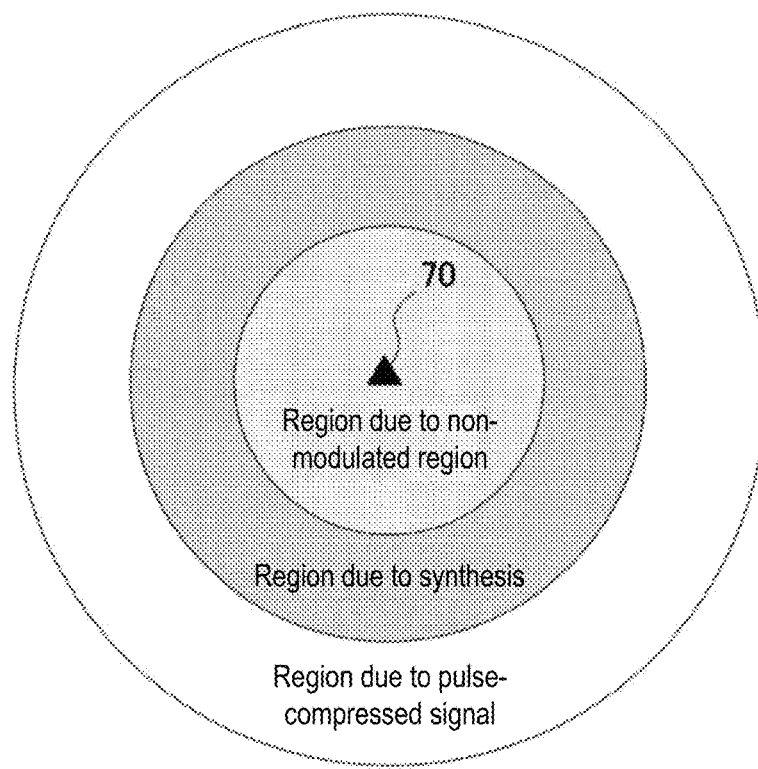

FIG. 7 is a diagram schematically illustrating an echo image of one scan with sections composed of synthesis of a non-modulated signal and a pulse-compressed signal.

Figure 8:
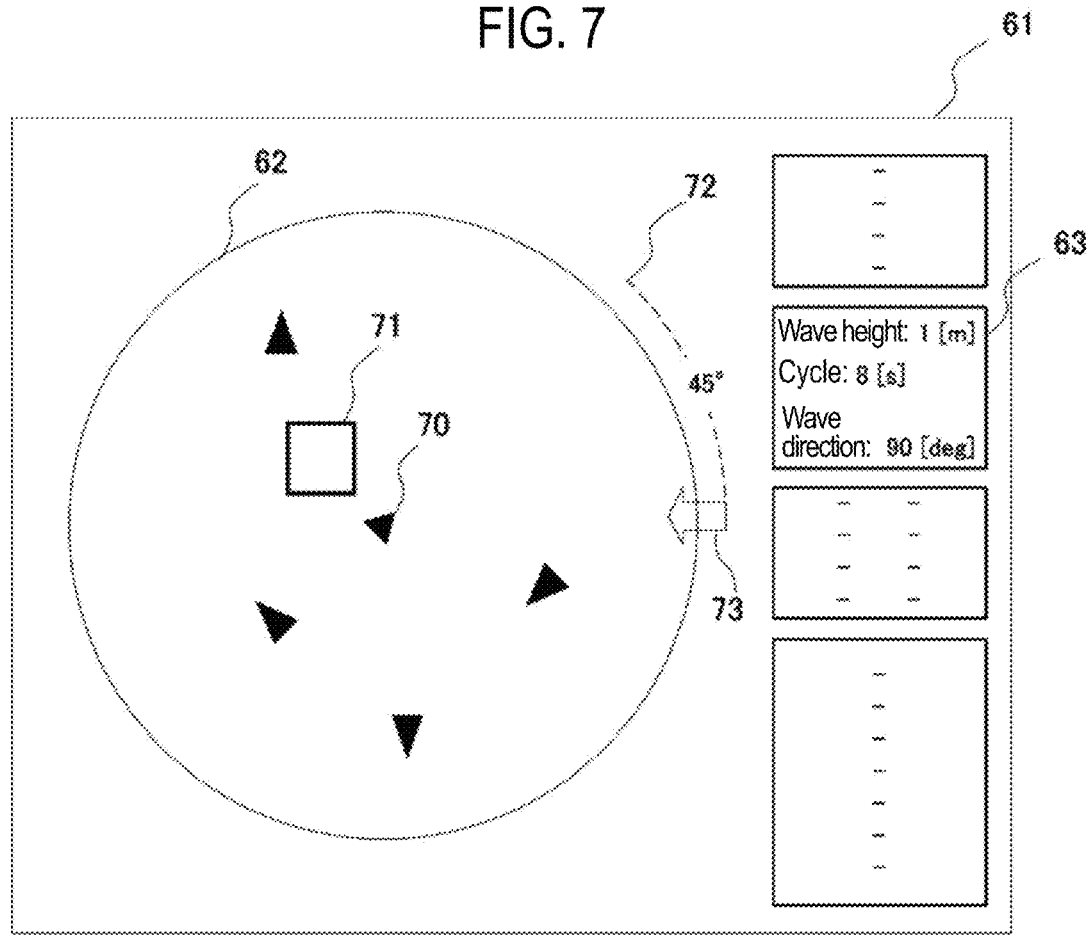

FIG. 8 is a diagram illustrating a wave analysis result and an echo image on the same screen according to an embodiment of the disclosure.

Figure 9:
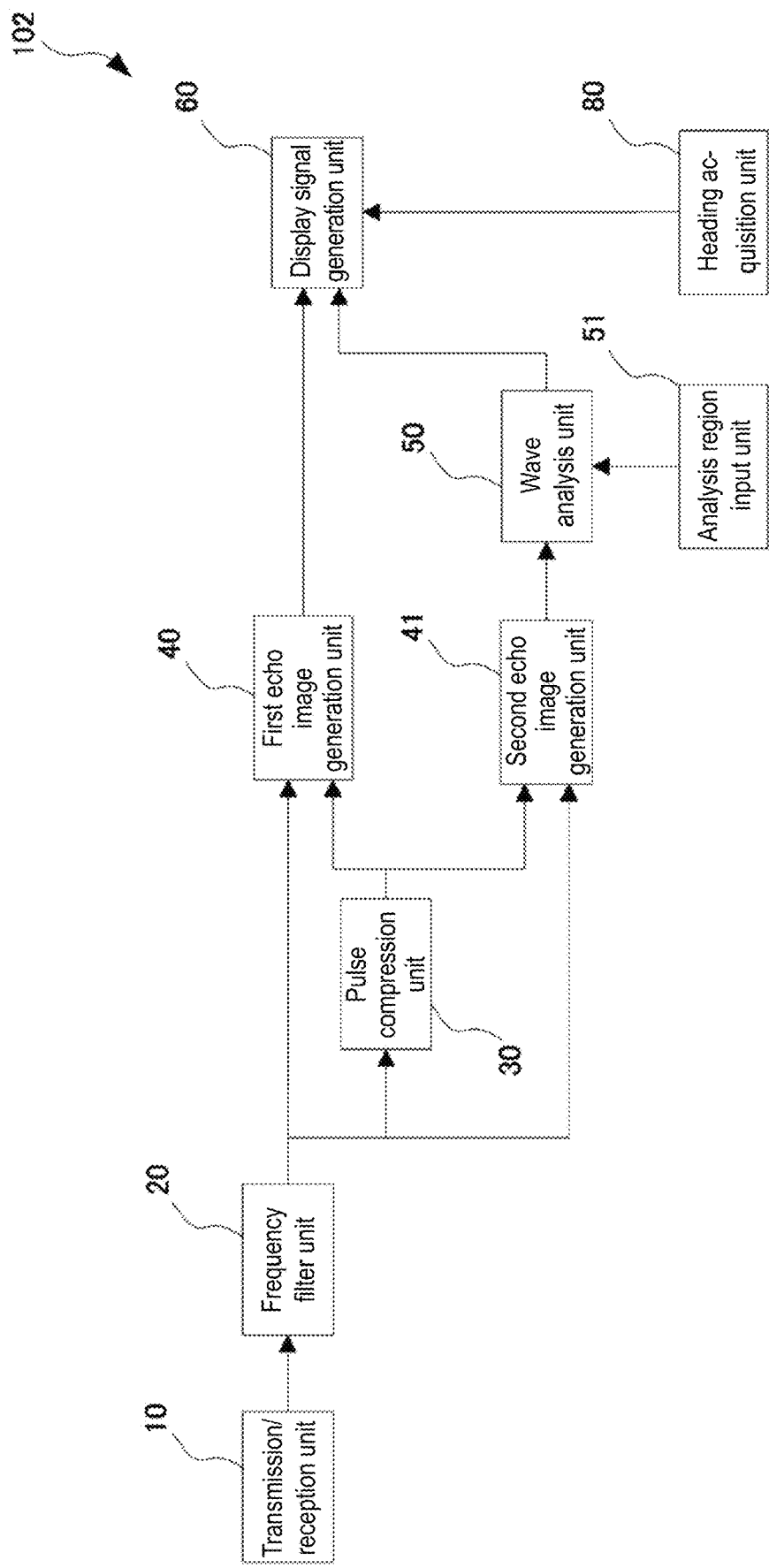

FIG. 9 is diagram illustrating a modified mode of a transmission signal according to an embodiment of the disclosure.

DETAILED DESCRIPTION

A solid-state radar device according to the embodiment of the disclosure is described with reference to the drawings.

The solid-state radar device in the embodiment is used as a radar for a ship, such as a merchant ship, a fishing ship, a pleasure boat, etc.

Basic Configuration and Basic Operation

Figure 1:
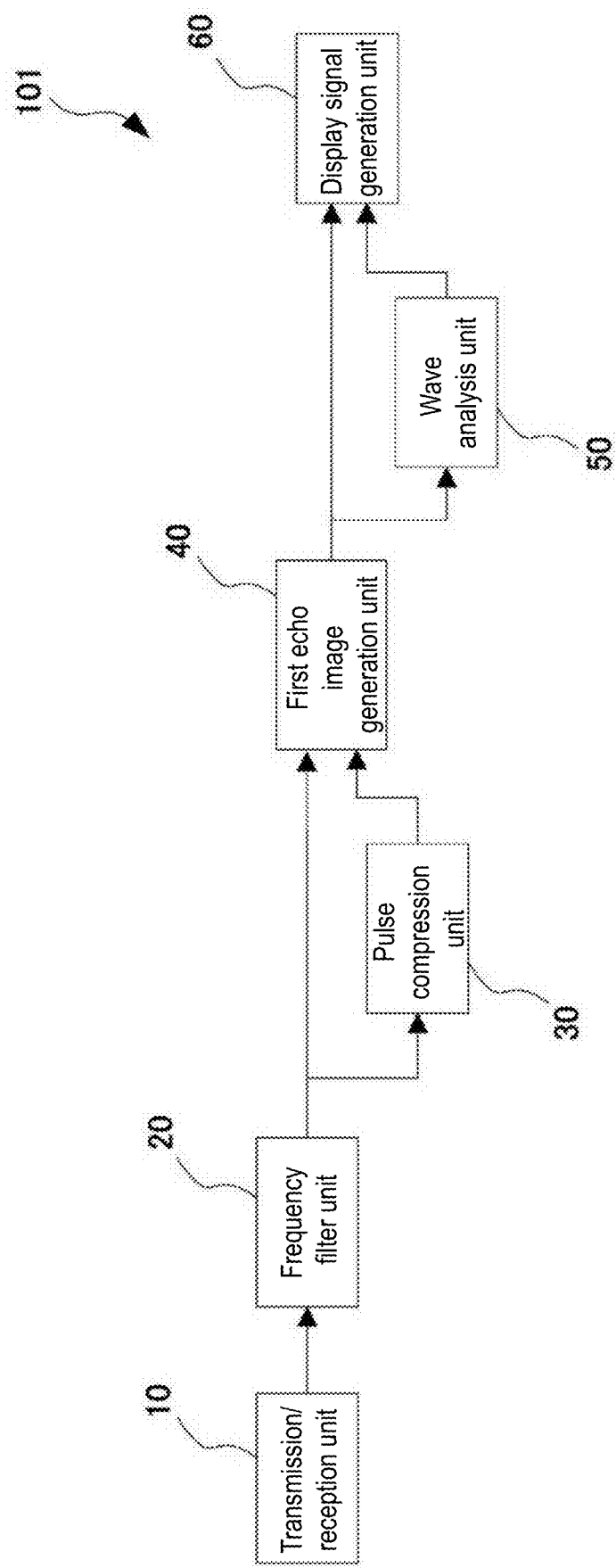
FIG. 1 is a block diagram illustrating an overall configuration of a solid-state radar device according to an embodiment of the disclosure.

In the following, the basic configuration and the basic operation of the disclosure are described. FIG. 1 is a diagram illustrating the configuration of a solid-state radar device 101 according to the embodiment.

Figure 2:
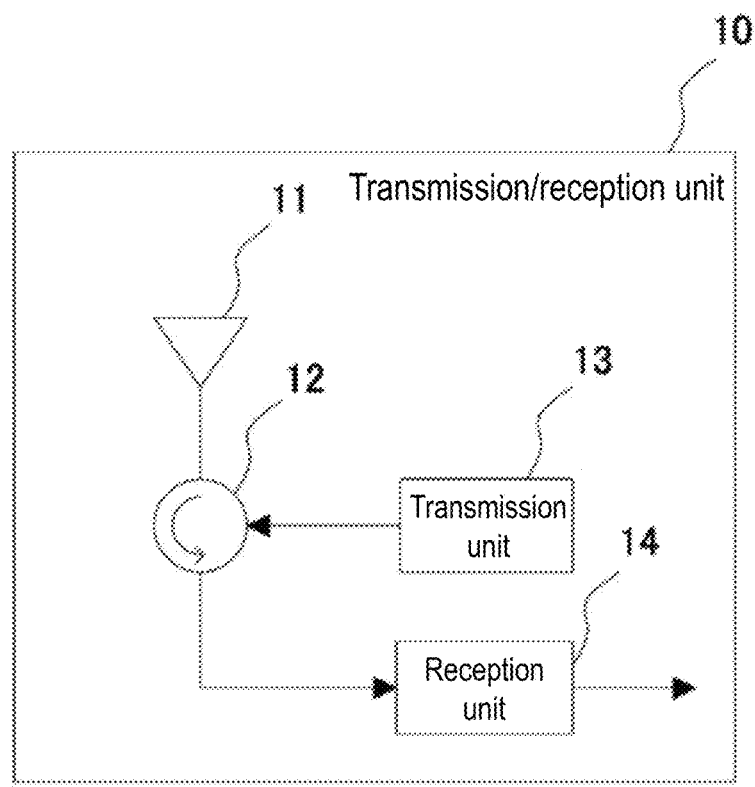
FIG. 2 is a block diagram illustrating details of a transmission unit according to an embodiment of the disclosure.

FIG. 2 illustrates the configuration of a transmission/reception unit 10. The transmission/reception unit 10 is formed by an antenna 11, a circulator 12, a transmission unit 13, and a reception unit 14, etc.

The transmission unit 13 alternately generates, as transmission signals, a modulated signal, which is a pulse signal whose frequency is modulated, and a non-modulated signal, which is a non-modulated pulse signal, and outputs the transmission signals to the circulator 12. At this time, the transmission unit 13 generates, as the transmission signals whose frequencies are different, the modulated signal and the non-modulated signal, so that the frequency bands do not overlap each other. In addition, while not shown in the drawings, the transmission unit 13 outputs a portion of the transmission signal relating to the modulated signal to a pulse compression unit 30.

The circulator 12 transmits the transmission signals from the transmission unit 13 to the antenna 11, and outputs reception signals received from the antenna 11 to the reception unit 14.

The antenna 11 is formed by arranging patch antennas, etc., in a row, and rotates thereby being able to orientate a transmission/reception surface in all directions (360 degrees) of a parallel surface with respect to a surface where the solid-state radar device 101 is disposed. The antenna 11 radiates the transmission signals with respect to an external space in various azimuths while rotating. A portion of the transmitted transmission signals is reflected by a reflection body such as an object, etc., present at sea level or in the sea. In addition, the antenna 11 receives, as the reception signals, a portion of the transmission signals that are reflected while rotating.

The reception unit 14 performs a reception process detecting the reception signals by using a double superheterodyne method and, after amplification by an amplifier, converting analog signals into digital signals by using an A/D converter.

Figure 3:
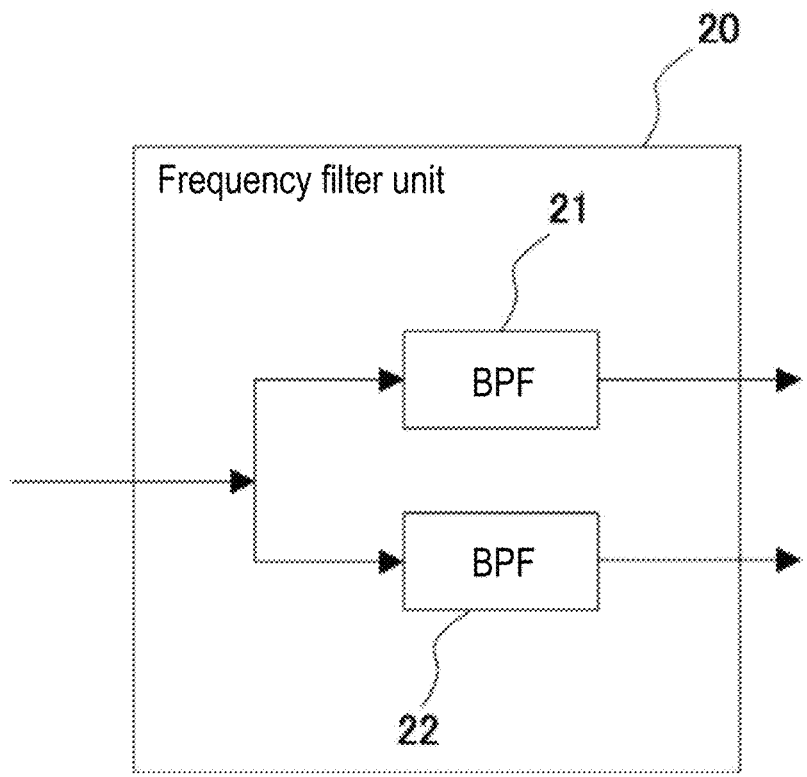
FIG. 3 is a block diagram illustrating the configuration of a frequency filter according to an embodiment of the disclosure.

FIG. 3 illustrates the configuration of a frequency filter unit 20. The frequency filter unit 20 is composed of two band-pass filters (BPF) separating the modulated signal and the non-modulated signal based on frequencies.

The reception signals subjected to the reception process in the reception unit 14 are respectively output to a BPF 21 and a BPF 22. The BPF 21 extracts the one with a lower frequency between the modulated signal and the non-modulated signal, and the BPF 22 extracts the other one with a higher frequency. Here, whether each of the BPF 21 and the BPF 22 extracts the modulated signal and the non-modulated signal depends on the setting of the frequencies of the modulated signal and the non-modulated signal. The two band-pass filters may also be formed from a low-pass filter (LPF) and a high-pass filter (HPF), as long as the filters are able to separate the modulated signal and the non-modulated signal.

The modulated signal extracted by one of the band-pass filters is output to the pulse compression unit 30. The non-modulated signal extracted by the other of the band-pass filters is output to a first echo image generation unit 40.

The pulse compression unit 30 converts the modulated signal into a pulse-compressed signal by performing a pulse compression process, and outputs the pulse-compressed signal to the first echo image generation unit 40. Here, the pulse compression process may be a conventionally known process, such as a matched filter method.

The first echo image generation unit 40 generates, as a first echo image, a sweep image based on sweep data, and outputs the sweep image to a wave analysis unit 50 and a display signal generation unit 60. Here, the sweep data is the signal data of a specific direction generated from the non-modulated signal and the pulse-compressed signal corresponding to consecutive transmission pulses. In addition, the sweep image is an image in which the distance from an own ship 70 to a particular distance is pixelated based on the sweep data of the modulated signal, and a distance that is further is pixelated based on the sweep data of the pulse-compressed signal, the azimuth direction being one pixel, and the distance direction being a particular number of pixels.

The wave analysis unit 50 generates an image of one polar coordinate system from multiple sweep images equivalent to one scan. In addition, the wave analysis unit 50 converts the image of the polar coordinate system into one scan image, which is an image of a Cartesian coordinate system with the own ship 70 being at the center. Here, "scan" refers to an operation of rotating the antenna 360 degrees while performing transmission/reception of radio wave signals. Radio wave signals are a general term referring to the transmission signal and the reception signal, which is the modulated signal or the non-modulated signal, and the reflected waves of the transmission signal.

Figure 4:
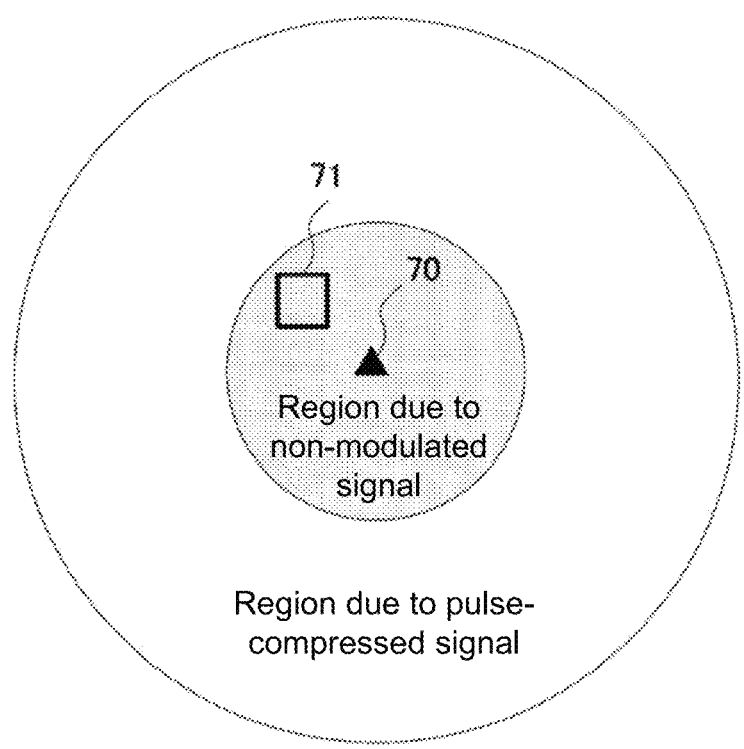
FIG. 4 is a diagram schematically illustrating an echo image of one scan with sections formed from a non-modulated signal and a pulse-compressed signal.

Then, the wave analysis unit 50 sets an analysis region 71, which is a portion of the region of the same pixel size, from a region of the area generated by the non-modulated signals or the pulse-compressed signals of multiple scan images that are consecutive in time. Here, FIG. 4 is an example in which the analysis region 71 is set in a region composed of the non-modulated signal in one scan image. The intensity information of multiple images corresponding to the location of the analysis region 71 is handled as a three-dimensional matrix. In addition, the wave analysis unit 50 calculates, as an analysis result (which is also referred to as ocean wave information) such as the wave height, the wave period, the wavelength, and the direction, etc., based on the result of a Fourier conversion on the three-dimensional matrix, and outputs the analysis result to the display signal generation unit 60. In this example, the period (which is also referred to as refresh rate) for calculating the analysis result is longer than the period for generating the sweep image.

The display signal generation unit 60 generates a display signal of a screen containing the sweep image and the wave analysis result. The solid-state radar device 101 may further include a display unit displaying the display signal generated by the display signal generation unit 60.

In the following, the effects in the basic configuration are described.

Difference in Transmission/Reception Process Between a Magnetron Radar and a Solid-State Radar The transmission unit of the magnetron radar has a magnetron element, and can transmit a pulse signal with a high peak power with respect to a solid-state element of the solid-state radar. Meanwhile, due to the characteristics of the solid-state element, the peak power of the transmission signal is low, so the transmission unit of the solid-state radar cannot transmit a pulse signal with power equivalent to that of the magnetron radar. Therefore, the solid-state radar cannot secure a detection distance by using the same pulse width as the magnetron radar. Therefore, the transmission unit of the solid-state radar transmits a temporally long pulse signal (modulated signal) whose frequency is modulated, ensures the S/N ratio by performing the pulse compression process at the time of reception, and secures the detection distance.

Here, in the solid-state radar, during the transmission of the modulated signal, a portion of the transmission signal is leaked to the reception unit 14. Therefore, the solid-state radar cannot receive the reflected wave of the modulated signal during the transmission of the modulated signal. Since the modulated signal of the solid-state radar is based on the assumption that the S/N ratio improves due to the pulse compression process, the modulation signal of the solid-state radar is longer than the transmission signal of the magnetron radar. As a result, the time during which the solid-state radar cannot receive the modulated signal is longer, and such time becomes the time during which the target in the vicinity of the own ship cannot be observed. In the following, the region in which the reflected wave of the modulated signal cannot be received is referred to as a dead region. For example, in the case where the pulse width of the modulated signal is about 10 μs, the dead region is in a range with a radius of about 1500 m from the own ship.

Here, the distance of the dead region from the own ship 70 is short, and the radio wave signals do not relatively attenuate when going back and forth from the transmission unit to the target. Therefore, the solid-state radar transmits non-modulated signals whose averaged power is low and pulse width is short, and interpolates the dead region of the modulated signal by generating an echo image of the dead region based on the reception signals of the non-modulated signals.

Accordingly, by using the modulated signal as well as the non-modulated signal in the transmission signal, the solid-state radar can observe targets from the vicinity of the own ship to a remote location.

Advantages of the Configuration

Due to the characteristics of the magnetron element, it is difficult for the magnetron radar to appropriately adjust the frequency of the transmission signal. Meanwhile, the solid-state radar can set respectively different frequencies for the transmission signals of the modulated signal and the non-modulated signal, and the respective reception signals thereof can be easily separated by using the band-pass filters.

Here, assuming that the magnetron radar alternately transmits a short pulse and a long pulse, the magnetron radar may serve as a combined radar for wave analysis and periphery monitoring. More specifically, as shown in (A) of FIG. 5, the magnetron radar can analyze waves based on the reception signal of a short pulse and generate the echo image of a remote location based on the reception signal of a long pulse.

Since the transmission signal is leaked to the reception side, the magnetron radar cannot receive one of the long pulse signal and the short pulse signal during transmission of the other. Therefore, in the combined configuration as the above for the magnetron radar, in order to individually secure the reception time of each transmission pulse, the transmission unit may decrease the pulse repetition frequency (PRF), which is the frequency of repeating each transmission pulse. However, the decrease in PRF decreases the respective azimuth resolutions of the short pulse and the long pulse as well as the hit number of the target, leading, in particular, to a decrease in the ability of detecting a remote target.

Meanwhile, the solid-state radar may easily change the frequency of the transmission signal, so the solid-state radar can consecutively transmit the modulated signal and the non-modulated signal of different frequencies. Therefore, as shown in (B) of FIG. 5, by separating the reception signals of the modulated signal and the non-modulated signal by using the band-pass filters, the other of the modulated signal and the non-modulated signal can be received during transmission of the other without the concern of leakage of the transmission signal. Accordingly, the solid-state radar does not need to decrease the PRF of the transmission signal.

Here, the wave analysis unit 50 of the embodiment calculates the analysis result by analyzing the region of a portion of the image composed of the first echo image generated in the first echo image generation unit 40. Therefore, it is not necessary for the transmission unit 10 to separately transmit the transmission signal used for analyzing the waves in the vicinity of the own ship and the transmission signal used for generating the display signal as the image of the periphery of the own ship. Accordingly, in the embodiment which analyzes the ocean wave information, it is not necessary for the solid-state radar to decrease the PRF of the transmission signal.

The wave analysis unit 50 analyzes the ocean wave information in a region formed by one of the non-modulated signal and the pulse-compressed signal in the first echo image. By setting the analysis region 71 so that the portions formed from the respective signals of the non-modulated signal and the pulse-compressed signal are not repetitively included, the wave analysis unit 50 can analyze the ocean wave information without generating another echo image for wave analysis. This is because the non-modulated signal and the pulse-compressed signal have different pulse properties, and the echo images respectively composed of the non-modulated signal and the pulse-compressed signal also have different properties. By setting the pulse width of the non-modulated signal to a very short pulse width for the analysis on the ocean wave information, the analysis result of the ocean wave information becomes highly accurate.

FIG. 6, which is the flowchart according to the embodiment of the disclosure, is described.

The transmission/reception unit 10 generates the transmission signals of the modulated signal and the non-modulated signal (Step S1). Then, the transmission/reception unit 10 performs a transmission process which radiates the generated transmission signals to the external space via the circulator 12 and the rotating antenna 11 (Step S2). Then, the transmission/reception unit 10 performs a reception process which receives the reflected waves that are the transmission signals reflected from a reflection body via the antenna 11 (Step S3)

The frequency filter 20 respectively extracts the modulated signal and the non-modulated signal from the reception signals by using the band-pass filters (Step S4). The frequency filter unit 20 outputs the modulated signal in the reception signals to the pulse compression unit 30 (Step S5). If the reception signal is not the modulated signal, that is, if the reception signal is the non-modulated signal, the frequency filter unit 20 inputs the reception signal to the first echo image generation unit 40 (Step S5). The pulse compression unit 30 performs a pulse compression process on the modulated signal, and outputs the pulse-compressed signal to the first echo image generation unit 40 (Step S6).

The first echo image generation unit 40 generates an echo image based on the sweep data of the modulated signal and the non-modulated signal (Step S7). Then, in the case where the first echo image is used in the wave analysis unit 50, the first echo image generation unit 40 outputs the first echo image to the wave analysis unit 50 (Step S8). In addition, in the case where the first echo image is not used in the wave analysis unit 50, the second echo image generation unit 41 generates a second echo image, and outputs the second echo image to the wave analysis unit 50 (Step S9).

The wave analysis unit 50 performs an analysis on the ocean wave information based on at least one of the non-modulated signal and the pulse-compressed signal, and outputs a wave analysis result, such as the wave height, the period, the wavelength, and the direction to the display signal generation unit 60 (Step S10).

The display signal generation unit 60 generates a display signal displaying the wave analysis result and the first echo image (Step S11).

In the following, various detailed embodiments are described.

Regions of Echo Images

At the time of generating the first echo image, the first echo image generation unit 40 can generate the first echo image by dividing into multiple regions with respect to the distance direction. In FIG. 4, the region in the vicinity of the own ship is formed by the non-modulated signal, and the remote region of the own ship is formed by the pulse-compressed signal. In addition, the wave analysis unit 50 sets the analysis region 70, among the regions, in the region formed by the non-modulated signal in the vicinity of the own ship, and analyzes the ocean wave information.

In the region due to synthesis in FIG. 7, the first echo image generation unit 40 generates the first echo image having a region formed due to synthesis of the non-modulated signal and the pulse-compressed signal between the regions respectively formed by the non-modulated signal and the pulse-compressed signal among the multiple divided regions. The process for the synthesis is a process in which the formation ratio of the non-modulated signal decreases as the distance from the transmission/reception unit increases. Accordingly, the first echo image is a seamless image in which the joined part of the regions of the two signals is not prominent.

Example of Display

In a display screen 61 shown in FIG. 8, an image 62 of the periphery of the own ship based on the first echo image is provided on the left, and the information of the wave height, the period, and the wave direction, which is a portion of the analysis result, is provided in a wave information area 63 on the right, and the display screen 61 displays the periphery image 62 and the wave information area 63 on the same display screen at the same time. In addition, the display screen 61 superimposes the analysis region 71 on the periphery image 62 based on the first echo image. In addition, the display screen 61 displays a wave vector 73, which is a portion of the analysis result, on the periphery image 62. Besides, the display signal generation unit 60 can generate two types of display signals displaying the first echo image and the analysis result on two respectively different display screens.

A solid-state radar device 102 in FIG. 9 further includes a heading acquisition unit 80.

The heading acquisition unit 80 calculates the heading of the own ship from sensor information of a GPS sensor or a gyrocompass acquiring the location information of the own ship, and outputs the heading to the display signal generation unit 60. The display screen 61 in FIG. 8 is a screen displaying the information of a relative angle 72 between the wave direction, which is a portion of the wave analysis result, and the heading of the own ship.

The wave analysis unit 50 may also perform a Fourier conversion on the three-dimensional matrix of the analysis region 71, and perform an inverse Fourier conversion after removing components other than waves through filtering based on the frequency of the waves of the analysis result, thereby generating, as a wave image, a two-dimensional image that emphasizes the ocean wave information as compared to a normal echo. The wave image is a three-dimensional image with which the wave height, the wavelength, and the wave direction can be grasped at a glance from the appearance, and is stored in advance with the values of the ocean wave information. The wave analysis unit 50 may also extract the stored wave image having the values of the ocean wave information close to the analysis result. In addition, the display signal generation unit 60 can generate a display signal in which the wave image and the first echo image are superimposed.

User Interface

As shown in FIG. 9, the solid-state radar device 102 can further include an analysis region input unit 51. The wave analysis unit 50 changes the location, the size, and the number of the analysis region 71 in correspondence with a user input.

Clutter Process

A portion of the transmission signals transmitted by the antenna 11 is reflected from the sea level, and the reflected waves of a portion thereof are received by the antenna 11. The strength of the received reflected wave depends on the incident angle with respect to the sea level, and the strength is higher when the distance from the transmission/reception unit 10 is shorter. Therefore, the ocean wave information mostly includes the reflected waves near the vicinity of the own ship.

Here, in order to more clearly reflect a target such as another ship, it is common to perform some signal processes on the echo image of the radar. One of such processes is a sensitivity time control (STC) process, which is a method for suppressing sea level reflection (sea clutter). The STC process is a process for conversion into a uniform image regardless of distance by suppressing the influence of the nearby sea level reflection by decreasing the gain with respect to a strong reflected wave from a short distance.

Meanwhile, the echo image of the radar used for wave analysis analyzes the ocean wave information included in the reflected waves, an STC process is normally not performed. This is because sea clutter is the analysis target in the wave analysis unit 50, and it is not necessary to attenuate the ocean wave information.

Therefore, the first echo image generation unit may also generate the first echo image in which a noise suppression process, etc., same as that performed for display is not performed, and output the first echo image to the wave analysis unit 50.

Generation of the Echo Image for Wave Analysis

In FIG. 9, the solid-state radar device 102 further includes a second echo image generation unit 41. The second echo generation unit 41 generates, in place of the first echo image, the second echo image used in the wave analysis unit 50, and outputs the second echo image to the wave analysis unit 50. The second echo image is formed by at least one of the non-modulated signal and the pulse-compressed signal. In addition, the wave analysis unit 50 sets the analysis region 71 in the region formed by one of the non-modulated signal and the pulse-compressed signal in the region of the second echo image and analyzes the ocean wave information. Accordingly, the second echo image generation unit 41 can generate the second echo image more suitable for the analysis on the ocean wave information while using the reception signal common to the formation of the first echo image. Regarding the process which the first echo image generation unit 40 as described herein, it is possible for the second echo image generation unit 41 to perform the same process.

Here, the second echo image generation unit 41 can generate the second echo image from the non-modulated signal only. In such case, the entire region forming the second echo image is formed by the non-modulated signal. Therefore, the wave analysis unit 50 can normally set the analysis region 71 irrelevant of the region formed from the pulse-compressed signal. Therefore, the wave analysis unit 50 can analyze the remote wave information in the range reflected by the echo. In addition, in such case, the pulse compression unit 30 can be configured to not output the pulse-compressed signal to the second echo image generation unit.

Modified Example

Example of Mounting the Solid-State Radar Device

The solid-state radar device may also be provided on land as long as the configuration is satisfied.

Digital and Analog Modes

The A/D conversion process described as a process in the transmission/reception unit 10 may be performed in any process. Therefore, the respective processes of the frequency filter unit 20 and the pulse compression unit 10 according to FIG. 1 may be performed by a central processing unit (CPU), and may also be processed by an analog circuit, which both are also referred to as processing circuitry.

Mode of Wave Analysis

The method for the process of the wave analysis is not particularly limited as long as the analysis result on the ocean wave information can be calculated from the echo image. For example, the wave analysis unit 50 may also acquire and analyze the relevance of the scan images consecutive in time or analyze the ocean wave information by calculating the cross spectra of these images and calculate the analysis result.

Interpretation of Main Text

Configurations of Modified Modes

The specific configurations of the respective units are not limited to only the above embodiment, and various modifications are possible without departing from the gist of the disclosure.

Language Interpretation

The execution sequence of the respective processes of the operations, the procedures, the steps and the stages in the device, the system, the program, and the method described in the claims, the specification, and the drawings can be realized in any order, as long as the output of a prior process is used in a subsequent process. Regarding the flow in the claims, the specification, and the drawings, even though the terms such as "firstly", "secondly" are used for the ease of explanation, it does not mean that it is necessary to execute in such order.

Reference Signs List

Terminology

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiment disclosed herein can be implemented or performed by a machine, such as a processor. A processor can be a microprocessor, but in the alternative, the processor can be a controller, microcontroller, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open"

terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface". The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated," and other such relational terms should be construed, unless otherwise noted, to include removable, movable, fixed, adjustable, and/or releasable connections or attachments. The connections/attachments can include direct connections and/or connections having intermediate structure between the two components discussed.

Unless otherwise explicitly stated, numbers preceded by a term such as "approximately", "about", and "substantially" as used herein include the recited numbers, and also represent an amount close to the stated amount that still performs a desired function or achieves a desired result. For example, unless otherwise explicitly stated, the terms "approximately", "about", and "substantially" may refer to an amount that is within less than 10% of the stated amount. Features of embodiments disclosed herein preceded by a term such as "approximately", "about", and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A solid-state radar device, comprising:
processing circuitry configured to:
transmit and receive radio wave signals comprising a modulated signal and a non-modulated signal, which are pulse signals whose frequencies are different from each other;
respectively extract the modulated signal and the non-modulated signal from the received radio wave signals based on the frequencies;
generate a pulse-compressed signal by pulse-compressing the modulated signal;
generate a first echo image based on the non-modulated signal and the pulse-compressed signal;
analyze ocean wave information based on one of the non-modulated signal and the pulse-compressed signal; and
generate a display signal comprising the first echo image and/or the ocean wave information.

2. The solid-state radar device as claimed in claim 1, wherein a refresh rate for generating the first echo image for each azimuth is more frequent than a refresh rate for analyzing the ocean wave information.

3. The solid-state radar device as claimed in claim 1, further comprising a rotating antenna, wherein the processing circuitry is further configured to:
analyze the ocean wave information by analyzing a scan image comprising the first echo image corresponding to at least one rotation of the antenna.

4. The solid-state radar device as claimed in claim 1, wherein:
the first echo image is divided into a plurality of regions in accordance with a distance from a transmission location, and the regions are formed from an image based on at least one of the non-modulated signal and the pulse-compressed signal; and
the processing circuitry is further configured to:
analyze the ocean wave information from one of the regions.

5. The solid-state radar device as claimed in claim 4, wherein at least one of the regions is formed from a synthesized image in which a formation ratio of the non-modulated signal and the pulse-compressed signal is changed in accordance with distance.

6. The solid-state radar device as claimed in claim 1, wherein the processing circuitry is further configured to:
generate a display signal in which the first echo image and the ocean wave information are displayed at a same time on a same screen.

7. The solid-state radar device as claimed in claim 1, wherein the processing circuitry is further configured to:
generate a display signal in which information of at least a portion of the ocean wave information is superimposed on the first echo image.

8. The solid-state radar device as claimed in claim 1, wherein the processing circuitry is further configured to:
generate a display signal in which an analysis region, which is a region for analyzing the ocean wave information, is superimposed on the first echo image.

9. The solid-state radar device as claimed in claim 8, wherein the processing circuitry is further configured to:
receive an input for setting or changing at least one of a number, a location, and a size of the analysis region.

10. The solid-state radar device as claimed in claim 1, further comprising a heading sensor configured to:
calculate a heading of an own ship on which the solid-state radar is to be installed, wherein
the ocean wave information contains a wave direction; and
the processing circuitry is further configured to:
generate a display signal indicating a relative angle between the wave direction and the heading.

11. The solid-state radar device as claimed in claim 1, wherein the processing circuitry is further configured to:
generate a display signal of a wave image based on the ocean wave information.

12. The solid-state radar device as claimed in claim 1, wherein the processing circuitry is further configured to:
generate a second echo image based on one of the non-modulated signal and the pulse-compressed signal, and
analyze the ocean wave information in a region of a portion of the second echo image.

13. The solid-state radar device as claimed in claim 1, further comprising a rotating antenna, wherein the processing circuitry is further configured to:
analyze the ocean wave information by analyzing a scan image comprising the second echo image corresponding to at least one rotation of the antenna.

14. A solid-state radar control method, comprising:
transmitting and receiving radio wave signals comprising a modulated signal and a non-modulated signal, which are pulse signals whose frequencies are different from each other;
respectively extracting the modulated signal and the non-modulated signal from the received radio wave signals based on the frequencies;
generating a pulse-compressed signal by pulse-compressing the modulated signal;
generating a first echo image based on the non-modulated signal and the pulse-compressed signal;
analyzing ocean wave information based on one of the non-modulated signal and the pulse-compressed signal; and
generating a display signal comprising the first echo image and/or the ocean wave information.

15. A non-transitory computer-readable medium having stored thereon computer-executable instructions which, when executed by a computer, cause a solid-state radar device to:

transmit and receive radio wave signals comprising a modulated signal and a non-modulated signal, which are pulse signals whose frequencies are different from each other;
respectively extract the modulated signal and the non-modulated signal from the received radio wave signals based on the frequencies;
generate a pulse-compressed signal by pulse-compressing the modulated signal;
generate a first echo image based on the non-modulated signal and the pulse-compressed signal;
analyze ocean wave information based on one of the non-modulated signal and the pulse-compressed signal; and
generate a display signal comprising the first echo image and/or the ocean wave information.

* * * * *